(12) United States Patent
Chu et al.

(10) Patent No.: US 10,267,319 B2
(45) Date of Patent: Apr. 23, 2019

(54) BLOWER

(71) Applicant: JOHNSON ELECTRIC INTERNATIONAL AG, Murten (CH)

(72) Inventors: Jun Jie Chu, Shenzhen (CN); Fu Ping Zhang, Shenzhen (CN); Yan Fang Zhi, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 77 days.

(21) Appl. No.: 15/424,015

(22) Filed: Feb. 3, 2017

(65) Prior Publication Data
US 2017/0222501 A1 Aug. 3, 2017

(30) Foreign Application Priority Data
Feb. 3, 2016 (CN) .......................... 2016 1 0077600

(51) Int. Cl.
*H02K 21/12* (2006.01)
*F04D 17/16* (2006.01)
(Continued)

(52) U.S. Cl.
CPC ......... *F04D 17/16* (2013.01); *F04D 25/0646* (2013.01); *F04D 25/082* (2013.01); *F04D 29/668* (2013.01); *H02K 1/146* (2013.01); *H02K 1/148* (2013.01); *H02K 1/2786* (2013.01); *H02K 15/095* (2013.01); *H02K 29/03* (2013.01); *H02K 2213/03* (2013.01); *H02K 2213/09* (2013.01)

(58) Field of Classification Search
CPC ............................ H02K 1/165; H02K 1/2786

USPC .................................... 310/216.001–216.137
See application file for complete search history.

(56) References Cited

U.S. PATENT DOCUMENTS 6,242,835 B1 * 6/2001 Uemura ................. H02K 3/493
310/214
6,742,238 B2 * 6/2004 Lee .................... H02K 15/0018
29/596
(Continued)

FOREIGN PATENT DOCUMENTS

DE  102005035451 B3  12/2006
EP    2 346 143 A2   7/2011
(Continued)

OTHER PUBLICATIONS

Duane C. Hanselman; "Brushless Permanent Magnet More Design"; Publisher's Cataloging-in-Publication Data; Magna Physics Publishing; pp. 111-114; May 22, 2012.

*Primary Examiner* — Hanh N Nguyen
(74) *Attorney, Agent, or Firm* — Muncy, Geissler, Olds & Lowe, P.C.

(57) ABSTRACT

A blower includes a housing, and an impeller and a motor received in the housing. The motor drives the impeller to rotate. The motor includes a stator and a rotor. The stator includes a stator core and windings wound around the stator core. The stator core includes a yoke and teeth extending from the yoke. A distal end of each of the teeth forms a tooth tip, with a slot opening formed between each two adjacent tooth tips. The rotor includes a permanent magnet forming a plurality of magnetic poles. The stator and the rotor define an air gap therebetween. A circumferential width of the slot opening is equal to or less than two times of a radial width of the air gap.

13 Claims, 18 Drawing Sheets

(51) Int. Cl.
   H02K 1/14     (2006.01)
   H02K 1/27     (2006.01)
   F04D 25/06    (2006.01)
   F04D 29/66    (2006.01)
   F04D 25/08    (2006.01)
   H02K 29/03    (2006.01)
   H02K 15/095   (2006.01)

(56)            References Cited

U.S. PATENT DOCUMENTS

| | | | |
|---|---|---|---|
| 8,354,769 B2 * | 1/2013 | Naganawa | H02K 1/146 |
| | | | 310/216.077 |
| 2002/0101126 A1 * | 8/2002 | Crapo | B62D 5/0403 |
| | | | 310/156.01 |
| 2005/0225194 A1 * | 10/2005 | Murakami | H02K 1/278 |
| | | | 310/216.113 |
| 2007/0035199 A1 * | 2/2007 | Yamamoto | H02K 1/148 |
| | | | 310/269 |
| 2008/0063542 A1 * | 3/2008 | Oguma | F04D 25/0613 |
| | | | 417/354 |
| 2009/0285699 A1 | 11/2009 | Muraoka et al. | |

FOREIGN PATENT DOCUMENTS

| | | |
|---|---|---|
| JP | 2002101594 A | 4/2002 |
| WO | WO 2011/029230 A1 | 3/2011 |

* cited by examiner

BLOWER

CROSS REFERENCE TO RELATED APPLICATIONS

This non-provisional patent application claims priority under 35 U.S.C. § 119(a) from Patent Application No. 201610077600.7 filed in The People's Republic of China on 3 Feb. 2016.

FIELD OF THE INVENTION

This invention relates to a ventilation device, and in particular to a blower.

BACKGROUND OF THE INVENTION

Blowers are commonly used air delivery devices which usually includes a motor to drive an impeller connected to the motor. The impeller in turn drives the air to generate an airflow. The motor generally includes a stator and a rotor rotatable about the stator. The rotor is connected to the impeller and hence drives the impeller to rotate to thereby drive the airflow. In order to reduce cost, single-phase motors have been used to drive the blower. However, a series disadvantage of a typical single-phase motor is that the rotor of the motor can easily stop at a dead-point position, which would result in startup failure of the motor. In order to deviate the stop position of the rotor from the dead-point position, teeth of the stator are usually configured to have unsymmetrical outer surfaces in the art. However, such motor configured has a very large cogging torque, which causes torque fluctuation and hence vibrations and noises of the motor.

SUMMARY OF THE INVENTION

Thus, there is a desire for a blower including a motor with reduced cogging torque and lower noise.

A blower is provided which includes a housing, and an impeller and a motor received in the housing. The housing comprises an inlet and an outlet. The motor is configured to drive the impeller to rotate such that air enters the housing via the inlet and is discharged via the outlet. The motor comprises a stator and a rotor. The stator comprises a stator core and windings wound around the stator core. The stator core comprises a yoke and a plurality of teeth extending radially outwardly from the yoke. A distal end of each of the teeth forms a tooth tip, with a slot opening being formed between each two adjacent tooth tips. The rotor comprises a permanent magnet forming a plurality of magnetic poles. The stator and the rotor define an air gap therebetween. A circumferential width of the slot opening is equal to or less than two times of a radial width of the air gap.

Preferably, the air gap is an even air gap, and an inner wall surface of the permanent magnet is concentric with outer wall surfaces of the tooth tips.

Preferably, the permanent magnet is in the form of a single piece having a plurality of magnetic poles.

Preferably, the permanent magnet comprises multiple magnet segments that are spaced from each other in a circumferential direction, and inner wall surfaces of the magnet segments are located on a common cylindrical surface.

Preferably, outer wall surfaces of the tooth tips are located on a common cylindrical surface.

Preferably, the teeth comprise first teeth integrally formed with the yoke and second teeth detachably connected to the yoke, and the first teeth and the second teeth are alternatively arranged in a circumferential direction.

Preferably, each tooth comprises a winding arm connected to the yoke, the tooth tip is formed at a distal end of the winding arm, two circumferential ends of the tooth tip extend circumferentially beyond the winding arm to form two wing portions, at least one of the two wing portions at two sides of each slot opening is tilted outwardly prior to a winding process, and the tilted wing portion is bent inwardly after the winding process is completed.

Preferably, a cutting groove is formed in a connecting area where the tilted wing portion is connected to the tooth.

Preferably, the cutting groove is formed in a central area of the inner wall surface of the tilted wing portion, and a section of the wing portion outside the cutting groove is tilted outwardly.

Preferably, the cutting groove is formed in a connecting corner area between the wing portion and the winding arm, and the whole wing portion is tilted outwardly.

Preferably, the teeth comprise first teeth and second teeth extending integrally from the yoke. The first teeth and the second teeth are alternatively arranged in a circumferential direction. The two wing portions of each of the first teeth are both tilted outwardly prior to a winding process, and the tilted wing portions of the first teeth are bent inwardly after the winding process is completed.

Preferably, a single one of the wing portions of each tooth is tilted outwardly prior to a winding process, the tilted wing portions of all teeth are located on same sides of the respective teeth, and after the winding process is completed, the tilted wing portions are bent inwardly such that the tooth tips are in the form of a circular arc.

Preferably, the motor is a single phase motor.

Preferably, the motor is an outer-rotor motor.

DETAILED DESCRIPTION OF THE PREFERRED EMBODIMENTS

Figure 1:
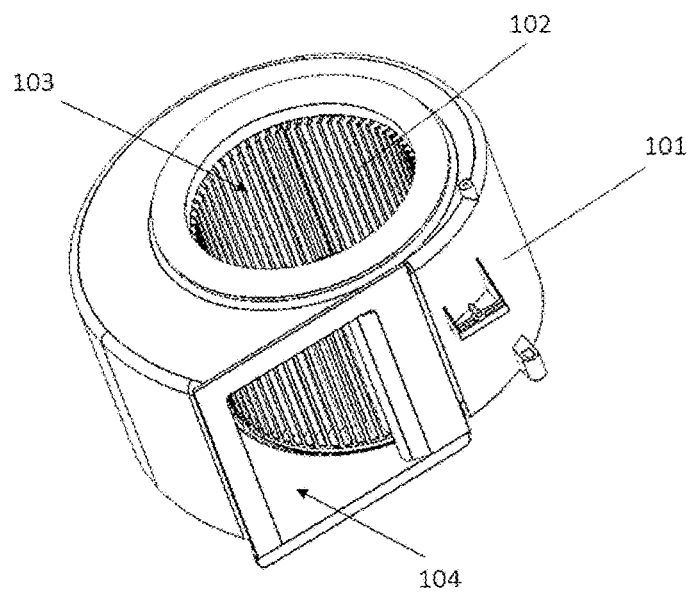
FIG. 1 illustrates a blower according to one embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

Figure 2:
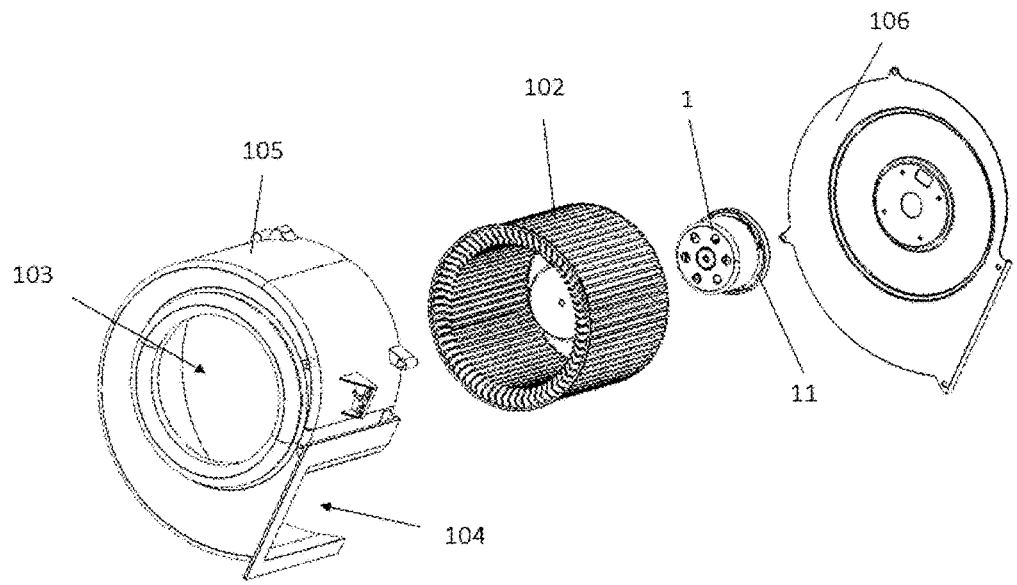
FIG. 2 is an exploded view of the blower of FIG. 1.

FIG. 1 and FIG. 2 illustrate a blower 100 according to one embodiment of the present invention. The blower 100 includes a housing 101, an impeller 102 received in the housing 101, and a motor 1 for driving the impeller 102. The housing 101 includes an inlet 103 and an outlet 104. The housing 101 includes an casing 105 and a cover 106. The casing 105 defines an opening at a bottom thereof, and the cover 106 is attached to the bottom of the casing 105 to cooperatively form a receiving chamber. The impeller 102 and the motor 1 are received in the receiving chamber. The motor 1 drives the impeller 102 to rotate, resulting in air being sucked into via the inlet 103 and discharged via the outlet 104. The blower 100 disclosed herein is particularly suitable for use as a bathroom ventilation fan.

Figure 3:
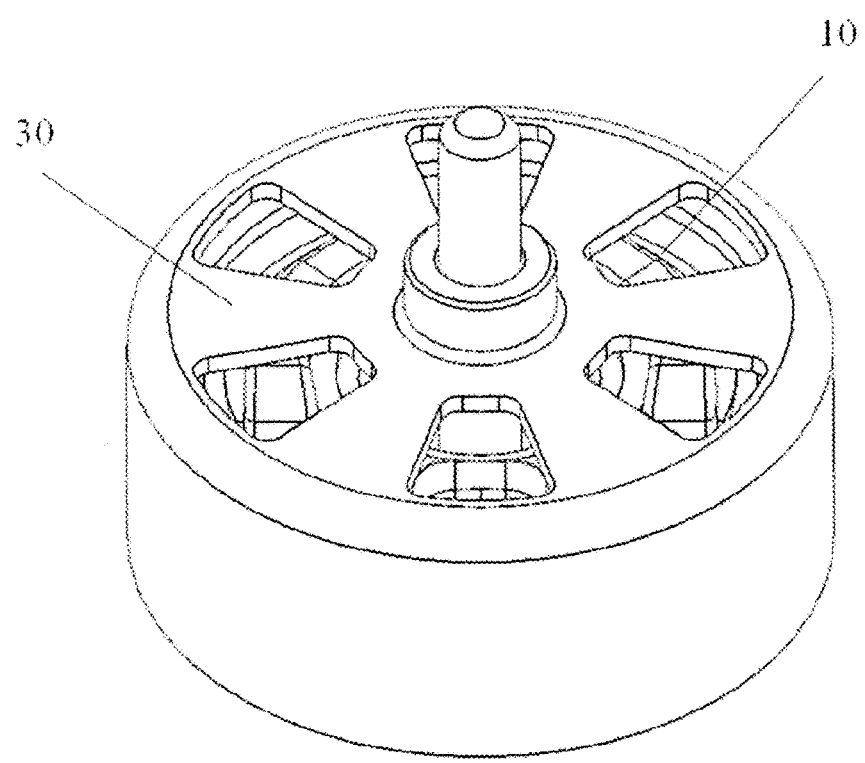
FIG. 3 illustrates the structure of the motor of the blower of FIG. 2.

Referring to FIG. 3, a single-phase outer-rotor motor 1 according to one embodiment of the present invention includes a stator 10 and a rotor 30 surrounding the stator 10.

Figure 4:
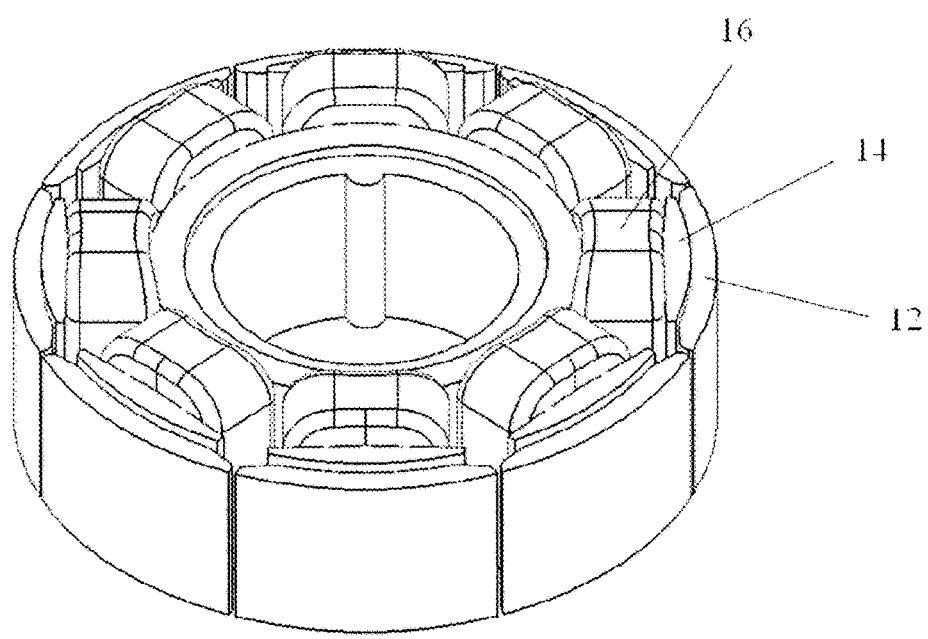
FIG. 4 illustrates the stator of the motor of FIG. 3.
Figure 5:
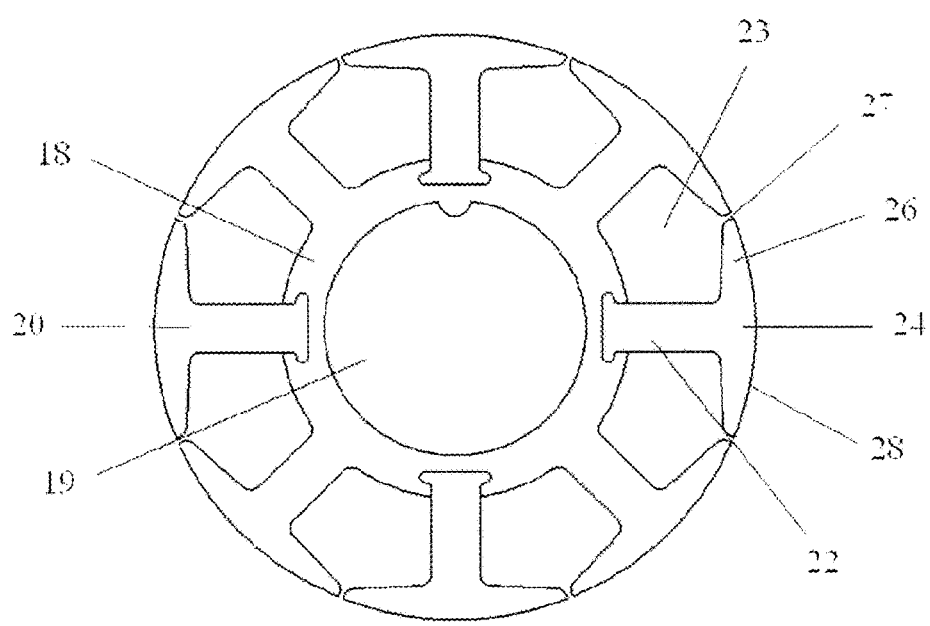
FIG. 5 illustrates the stator core of the stator of FIG. 4.
Figure 6:
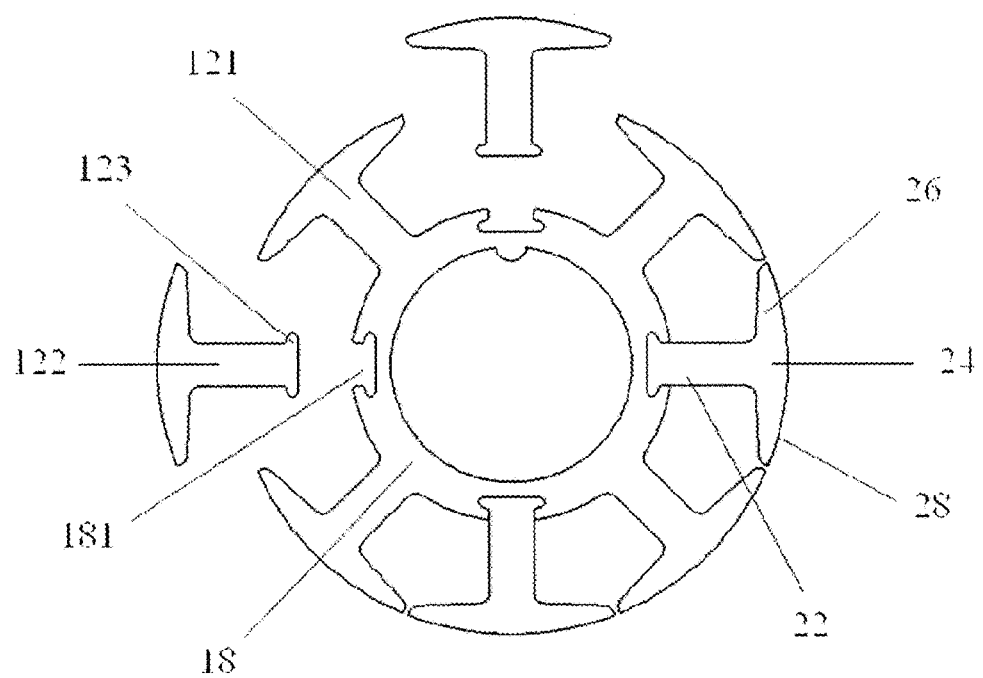
FIG. 6 is a partially exploded view of the stator core of FIG. 5.

Referring also to FIG. 4 to FIG. 6, the stator 10 includes a base 11 (FIG. 2), a stator core 12 fixed on the base 11, an insulating bracket 14 mounted on the stator core 12, and windings 16 wound around the insulating bracket 14. The stator core 12 is made by stacking magnetic laminations, such as silicon steel sheets. The stator core 12 includes a yoke 18 preferably of annular shape, and a plurality of teeth 20 extending radially and outwardly from an outer periphery of the yoke 18. The yoke 18 defines a space 19 therein, for being assembled with the base 11 to fix the stator 10. The teeth 20 are evenly spaced from each other along the circumferential direction of the yoke 18. Each of the teeth 20 includes a winding arm 22 connected to the yoke 18 and a tooth tip 24 formed at a distal end of the winding arm 22. The windings 16 are wound around the winding arms 22 and located inside the tooth tips 24. The windings 16 are separated from the winding arms 22 and from the tooth tips 24 by the insulating bracket 14. The insulating bracket 14 is made of insulating plastic for avoiding short circuit of the windings 16. When the motor 1 is started, the windings 16 are energized to cause the stator core 12 to be polarized such that the tooth tip 24 of each of the teeth 20 forms one magnetic pole of the stator 10.

The winding arms 22 are each elongated in shape, with a winding slot 23 formed between each two adjacent winding arms 22. Preferably, the tooth tip 24 is overall arcuate in shape which is symmetrical about a radius of the motor 1 that passes a center of the winding arm 22 of the tooth 20. The tooth tip 24 has a width along a circumferential direction thereof larger than a circumferential width of the winding arm 22, and two circumferential sides of the tooth tip 24 extend beyond the winding arm 22 to form two wing portions 26, respectively. Preferably, a width of the wing portion 26 of the tooth tip 24 extending beyond the winding arm 22 is approximately equal to or slightly less than a half of a width of the winding slot 23 at a radial outer end of the winding arm 22. Adjacent distal ends of adjacent wing portions 26 of the two adjacent tooth tips 24 are close to but spaced from each other, with a narrow slot opening 27 formed therebetween. An outer surface of each tooth tip 24 faces toward the rotor 30 and acts as an arc pole face 28 of the magnetic pole of the stator 10. In this embodiment, the pole face 28 is a circular arc surface, and the pole faces 28 of all tooth tips 24 are located on a common cylindrical surface that is concentric with the stator 10.

Figure 7:
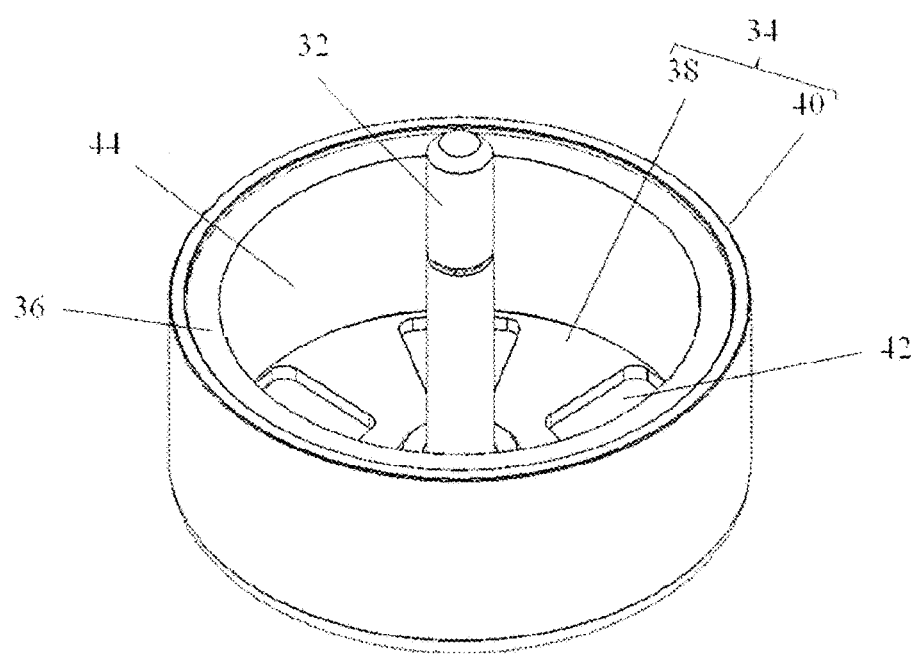
FIG. 7 illustrates the rotor of the motor of FIG. 3, viewed from another aspect.
Figure 8:
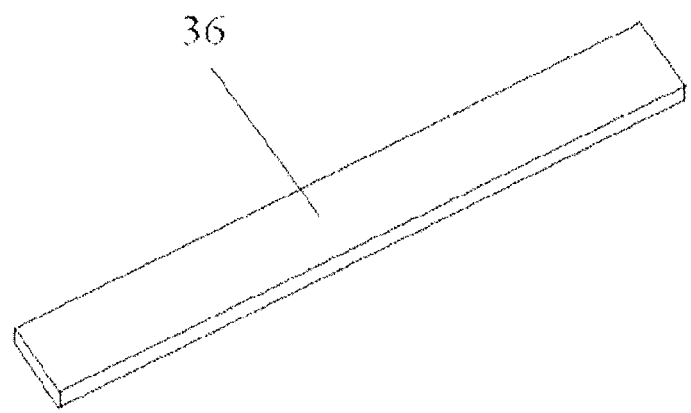
FIG. 8 illustrates the permanent magnet, prior to being formed, of the rotor of FIG. 7.

Referring also to FIG. 7 and FIG. 8, the rotor 30 includes a rotary shaft 32, a rotor yoke 34 fixedly connected to the rotary shaft 32, and a permanent magnet 36 disposed on the rotor yoke 34. The rotor yoke 34 is a hollow cylinder with an open end, which covers around the stator 10. The rotor yoke 34 includes an end plate 38 and an annular sidewall 40 extending from the end plate 38. The rotary shaft 32 is fixedly connected to a center of the end plate 36. Preferably, the end plate 38 defines a plurality of openings 42 for allowing air outside to enter an interior of the motor 1 to cool the motor 1 itself, particularly the stator 10 received in the rotor 30. The permanent magnet 36 is attached to an inner wall surface 40 of the yoke 34, which may be fixed to the sidewall 40 with adhesive.

Figure 9:
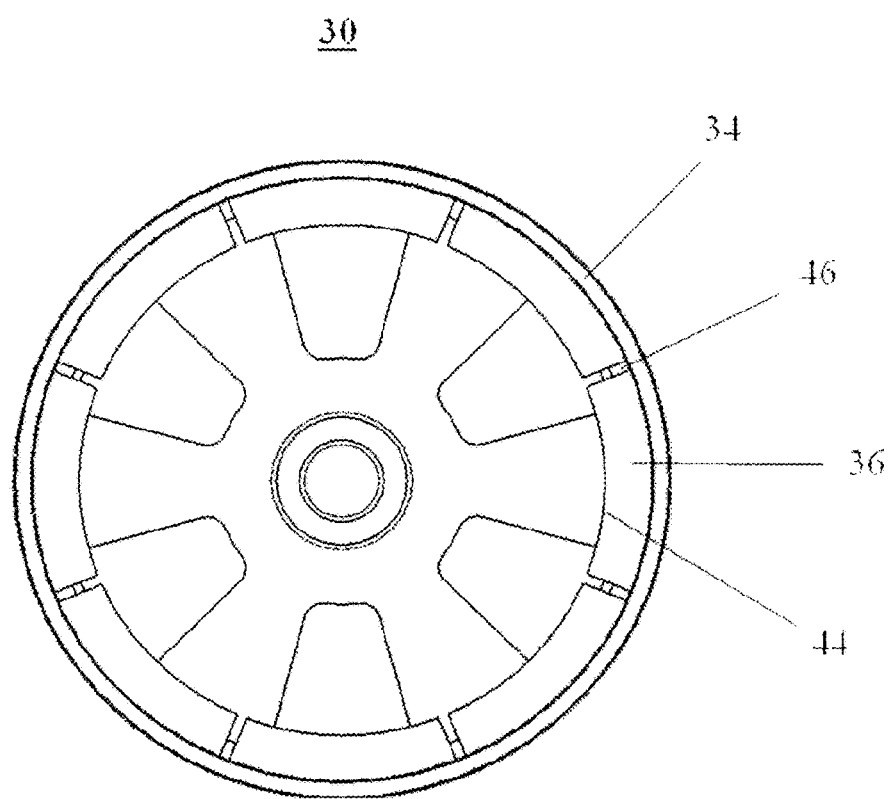
FIG. 9 illustrates a rotor according to another embodiment.

In this embodiment, the permanent magnet 36 is of a circular ring structure which may be formed by bending or coiling an elongated permanent magnet as shown in FIG. 8. The permanent magnet 36 is divided into sections along a circumferential direction of the rotor 30, with each section acting as one magnetic pole of the rotor 30, and adjacent magnetic poles having opposite polarities. An inner surface of the permanent magnet 36 acts as a pole face 44 of the rotor 30. The pole face 44 is a cylindrical surface that is concentric with the rotor 10 and continuous along the circumferential direction. In another embodiment, the permanent magnet 36 may also be a segmented structure, with each magnet segment 36 acting as one magnetic pole, adjacent magnet segments having opposite polarities, and each two adjacent magnet segments 36 defining a gap 46 therebetween (FIG. 9). When the permanent magnet 36 is of the segmented structure, the pole face 44 is interrupted at each gap 46.

In assembly, the stator 10 and the rotor 30 are coaxially disposed, with the permanent magnet 36 of the rotor 30 surrounding the stator 10, and the rotary shaft 32 rotatably inserted into the stator 10. A bearing is disposed in the base 11 of the stator 10 in a known way to support the rotary shaft 32 for rotation. The end plate 38 of the yoke 34 is located at an axial side end of the stator 10. Preferably, the rotor 30 and the stator 10 have the same number of the magnetic poles. For example, in this embodiment, the stator 10 includes eight teeth forming eight slot openings 27, the permanent magnet 36 of the rotor 30 correspondingly is divided into eight sections, and the stator 10 and the rotor 30 cooperatively form an eight-pole eight-slot motor. Preferably, the windings 16 of the stator 10 are electrically connected and supplied with a single phase alternating direct current power by a driver circuit of a single phase brushless direct current motor to thereby achieve the single phase brushless direct current motor.

Figure 10:
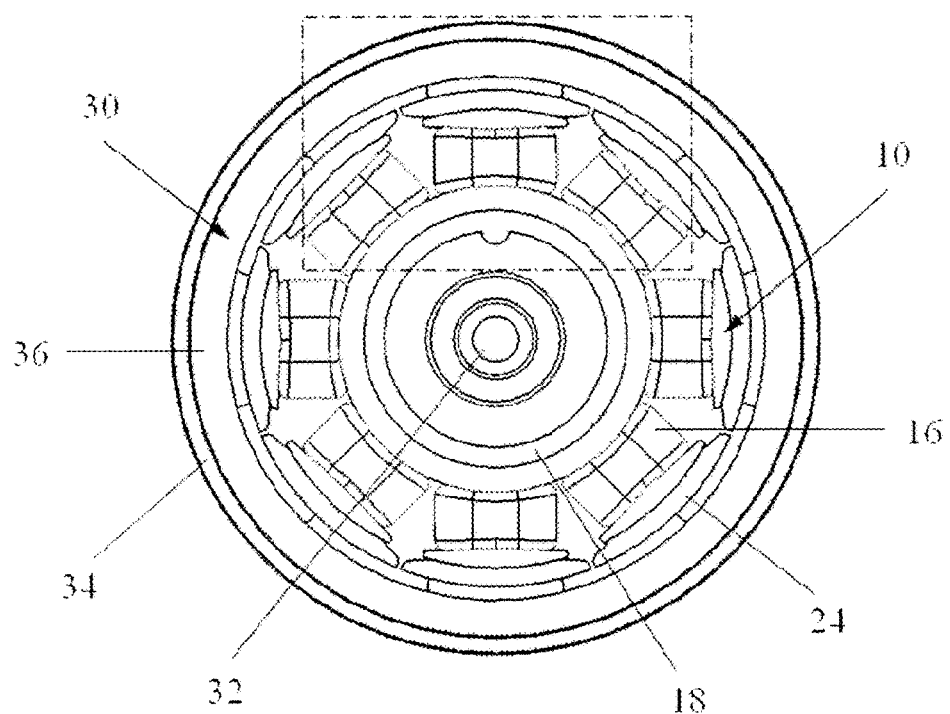
FIG. 10 is an axial plan view of the motor of FIG. 3.
Figure 11:
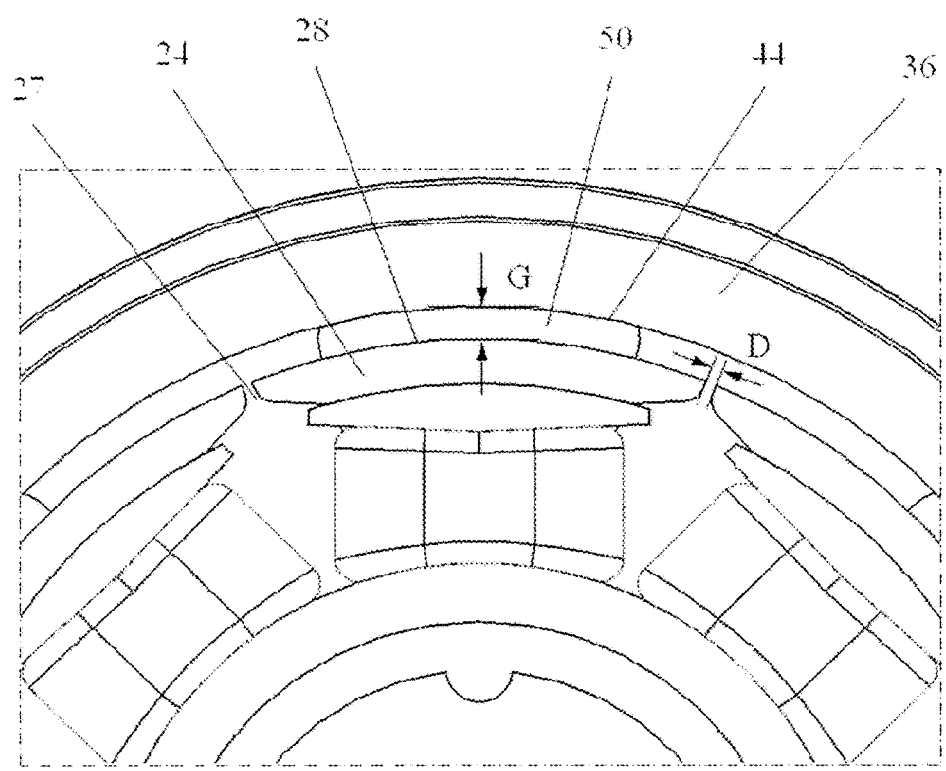
FIG. 11 is an enlarged view of a dash-boxed portion of FIG. 10.

Referring also to FIG. 10 and FIG. 11, after assembly of the rotor 30 and the stator 10, the pole face 44 of the permanent magnet 36 of the rotor 30 and the pole faces 28 of the tooth tips 24 of the stator 10 are opposed to and spaced from each other in the radial direction, with an air gap 50 formed therebetween. The pole face 44 of the rotor 30 is the cylindrical surface, the pole faces 28 of the stator 10 are located on the common cylindrical surface, and the stator 10 and the rotor 30 are concentrically disposed. Therefore, the radial width of the air gap 50 between the stator and the rotor keeps constant along the circumferential direction, thus forming an even air gap between the stator and the rotor. Preferably, a width D of the slot opening 27 of the stator 10 is not greater than two times of a radial width G of the air gap 50, i.e. D≤2 G. In this embodiment, the width D of the slot opening 27 is less than the radial width G of the air gap 50, i.e. D<G.

Because the width of the slot opening 27 is less than or equal to two times of the width of the air gap, when the motor 10 stops rotation, a magnetic leakage field can be utilized to position the rotor, which makes the rotor 30 stop at a position where a center line between two adjacent rotor magnetic poles is substantially aligned with a center of the tooth tip 24 of the stator 10, and a center of the magnetic pole of the rotor 30 is substantially aligned with one slot opening 27 between adjacent tooth tips 24. As such, when stopping, the rotor 30 deviates from the dead-point position (i.e. where the center of the magnetic pole of the rotor 30 is aligned with the center of the tooth tip 24 of the stator 10) and can be easily started again once the motor 1 is energized again. The cogging torque of the single-phase permanent magnet brushless motor configured as above can be effectively suppressed, such that the motor has enhanced efficiency and performance. Experiments show that a peak of the cogging torque of a single-phase outer-rotor brushless direct current motor configured as above (with a rated torque of 1 Nm, a rated rotation speed of 1000 rpm, and a stack height of the stator core of 30 mm) is less than 80 mNm. In addition, the motor of the present invention can be designed with bidirectional startup capability to meet different requirements. For example, the bidirectional rotation can be achieved by using two position sensors such as Hall sensors and an associated controller. It may also be designed to start up in a single direction, in which case only one position sensor is needed.

In order to prevent the narrow slot openings 27 from affecting the winding process of the windings 16, in this embodiment, as shown in FIG. 5 and FIG. 6, the teeth 20 of the stator core 12 include a plurality of first teeth 121 and a plurality of second teeth 122 arranged alternatively along the circumferential direction of the stator core 12. The first teeth 121 are integrally connected with the yoke 18 and the second teeth 122 are detachably connected with the yoke 18. Preferably, the yoke 18 has a plurality of mounting slots 181. Preferably, the mounting slots 181 are of dovetail shape. Radial inner ends of the second teeth 122 each have an protruding portion 123 that matches a corresponding one of the mounting slots 181 in shape and preferably also in size. The protruding portions 123 are engaged into the mounting slots 181 to connect the second teeth 122 with the yoke 18, thus forming the stator core 12.

Before the windings 16 are wound, the second teeth 122 are not assembled to the yoke. In absence of the second teeth 122, a wide space is formed between the first teeth 121, which allows for quick and convenient winding of the windings 16 around the first teeth 121 and the second teeth 122, respectively. After the winding process is completed, the second teeth 122 are connected to the yoke 18, such that adjacent tooth tips 24 of the adjacent second tooth 122 and first tooth 121 form the narrow slot opening 27 therebetween. This process can ensure that the width D of the slot opening 27 is small enough. The use of separately formed second teeth 122 in the stator core 12 allows the first teeth 121 to form sufficient large winding spaces therebetween, which facilitates winding process and ensures small cogging torque of the formed stator 10 as well. FIG. 12 to FIG. 19 illustrate several alternate embodiments of the stator core 12 which can realize similar functions in different ways.

Figure 12:
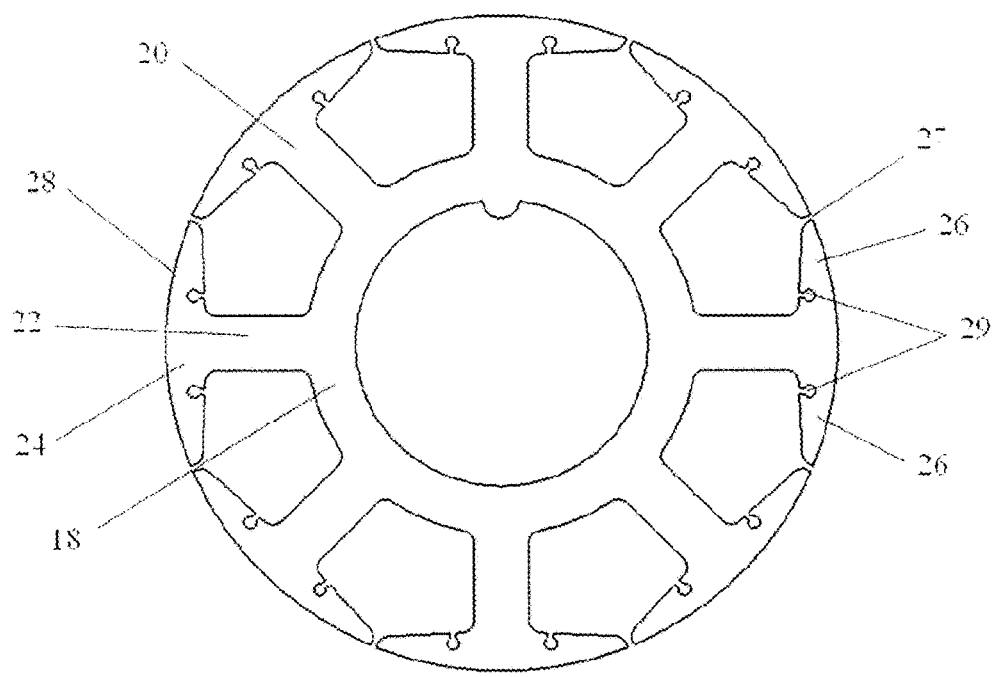
FIG. 12 illustrates a stator core according to a second embodiment.
Figure 13:
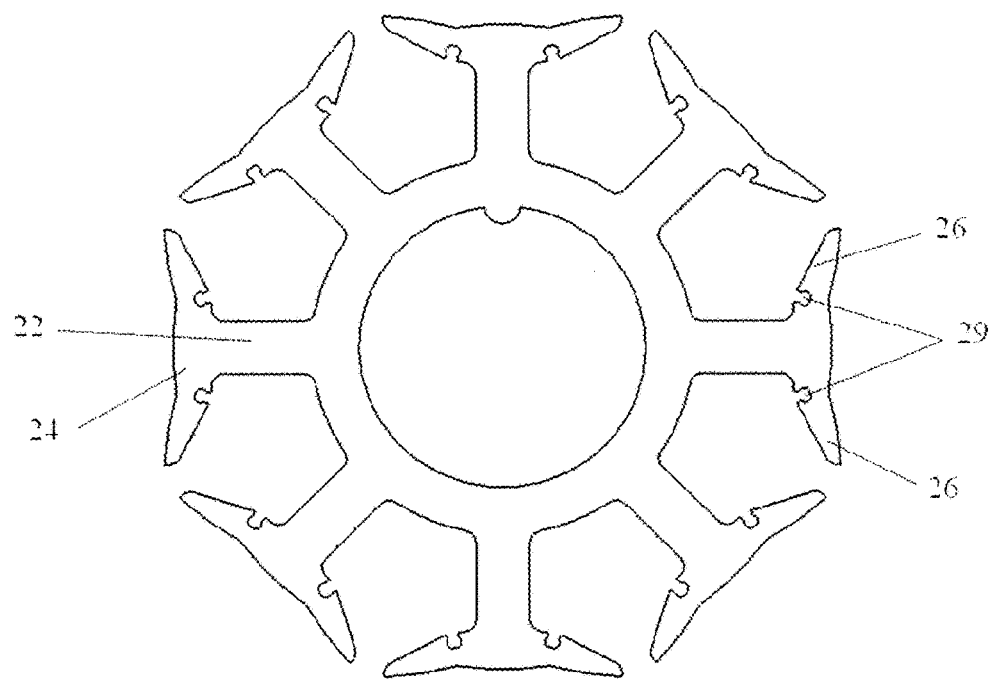
FIG. 13 illustrates the stator core of FIG. 12, prior to the winding process.

FIG. 12 and FIG. 13 illustrate a second embodiment of the stator core 12, which differs from the above embodiment in that: all teeth 20 extend integrally outwardly from the yoke 18. Each tooth 20 forms cutting grooves 29 in the respective two wing portions 26 of the tooth tip 24. Each cutting groove extends outwardly from a central area of the inner wall surface of the wing portion 26 into the winding portion 26. The cutting groove 29 has a depth that is preferably a half of the thickness of the tooth tip 24 at the cutting groove 29, such that the cutting groove 36 does not impact the magnetic path. As shown in FIG. 13, prior to forming the stator core 12, a section of the tooth tip 24 outside the cutting groove 29 is tilted outwardly to enlarge the gap between adjacent tooth tips 24, such that the windings 16 can be conveniently wound around the winding arms 22. After the windings are completed, the outer wall surface of the tooth tip 24 is forced, making the tooth tip 24 deformed to bend inwardly, thus forming the pole face 28. During this process, the gap between the tooth tips 24 decreases to form the narrow slot opening 27, and the cutting groove 29 becomes narrower and forms into a slit shape, or even disappears completely.

Figure 14:
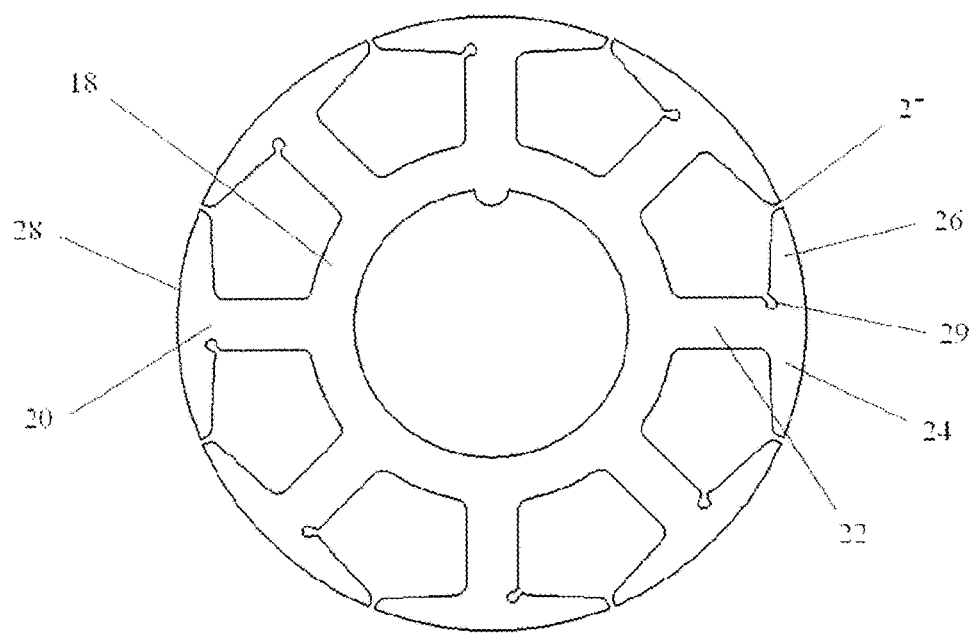
FIG. 14 illustrates a stator core according to a third embodiment.
Figure 15:
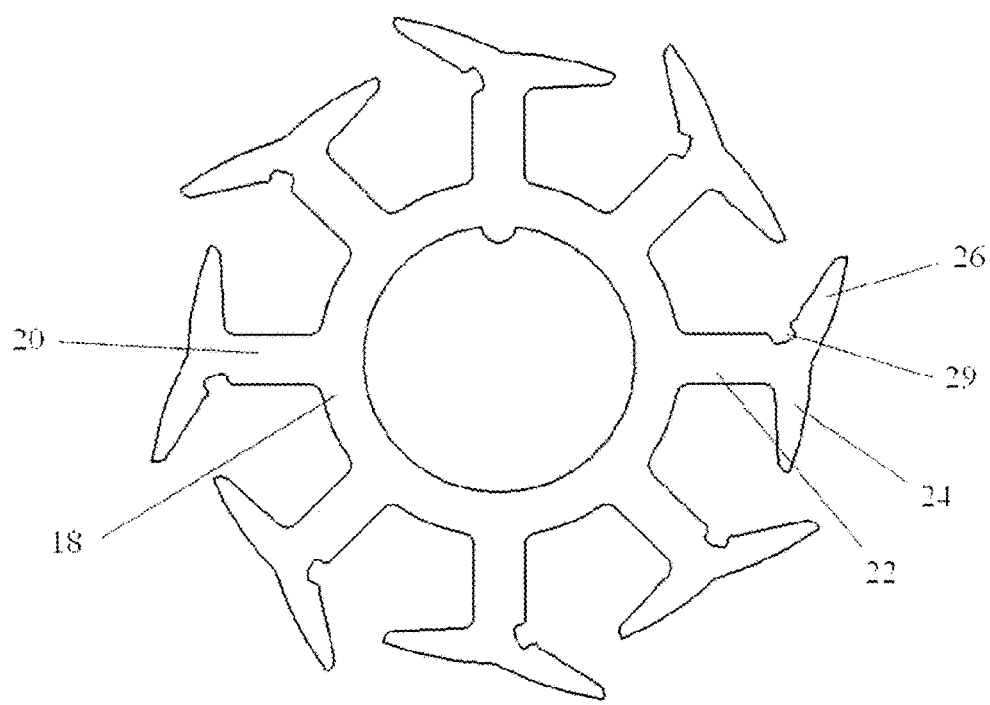
FIG. 15 illustrates the stator core of FIG. 14, prior to the winding process.

Referring to FIG. 14, in some embodiments, the cutting grooves 29 may be formed in connecting corner areas between the tooth tips 24 and the winding arms 22. In addition, in this embodiment, each tooth 20 of the stator core 12 forms only a single cutting groove 29. Viewed in the direction as illustrated in the figure, each cutting groove 29 is formed in the connecting corner area between one winding arm 22 and the wing portion 26 at a counter-clockwise side of the winding arm 22. Referring also to FIG. 15, prior to the winding process, the wing portion 26 at the side where the cutting groove 29 is formed is tilted outwardly. For the two opposed wing portions 26 of two adjacent teeth 20, one wing portion is in the form of the normal circular arc, while the other is tilted outwardly, which can also enlarge the gap between the two wing portions 26 for facilitating the winding process. After the winding process is completed, the outwardly tilted wing portion 26 is bent inwardly to deform into the circular arc shape, such that the gap between the adjacent wing portions 26 becomes narrower to form the narrow slot opening 27 to thereby reduce the cogging torque.

Figure 16:
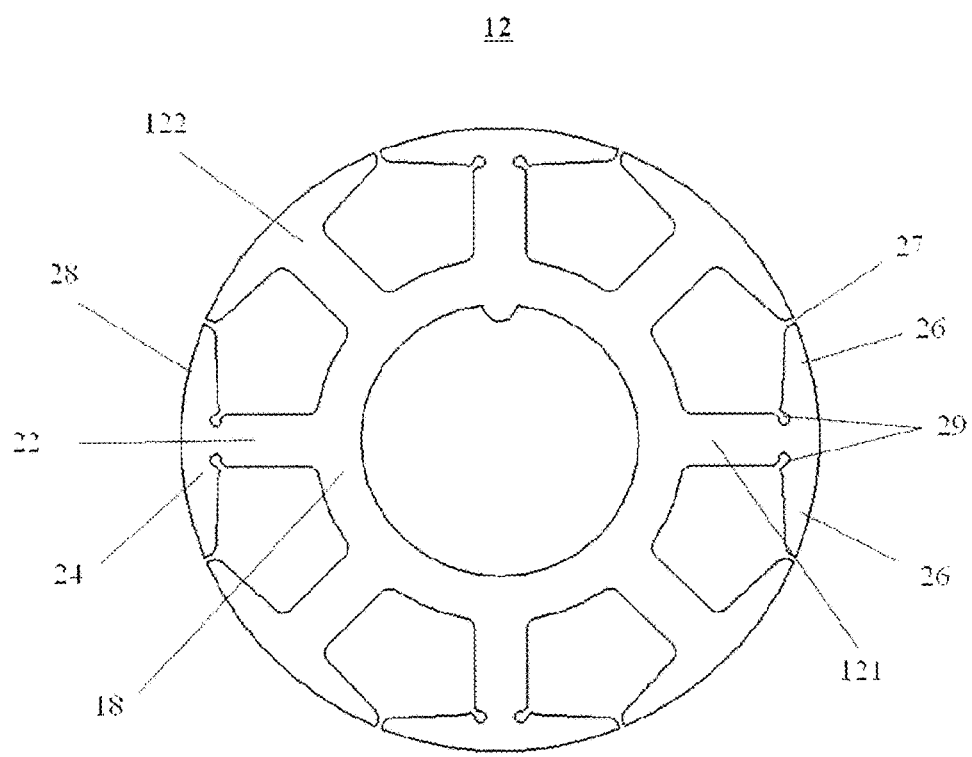
FIG. 16 illustrates a stator core according to a fourth embodiment.
Figure 17:
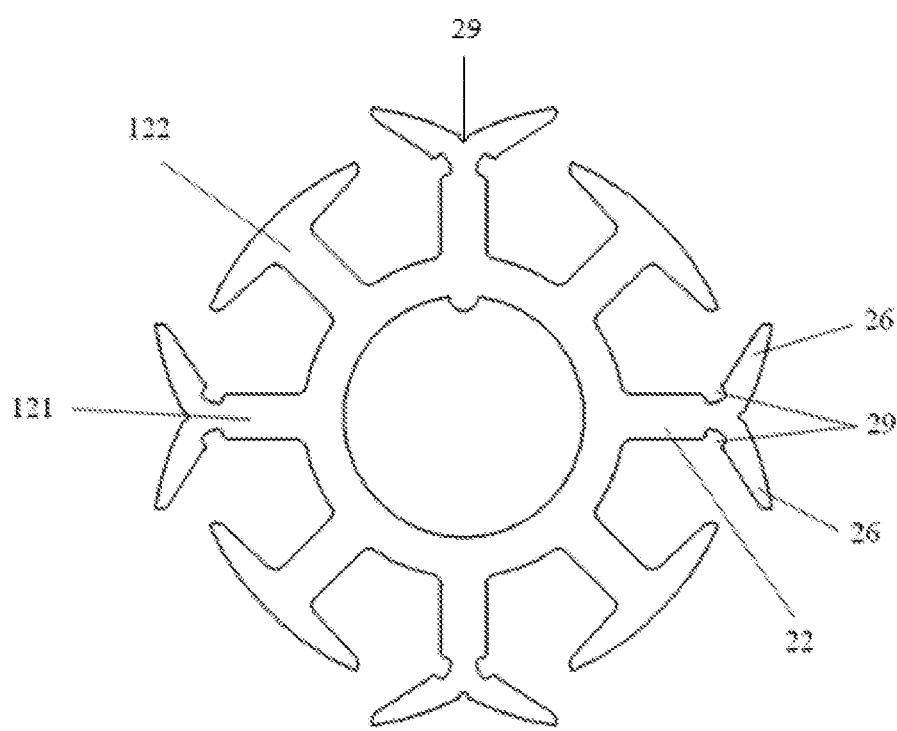
FIG. 17 illustrates the stator core of FIG. 16, prior to the winding process.
Figure 18:
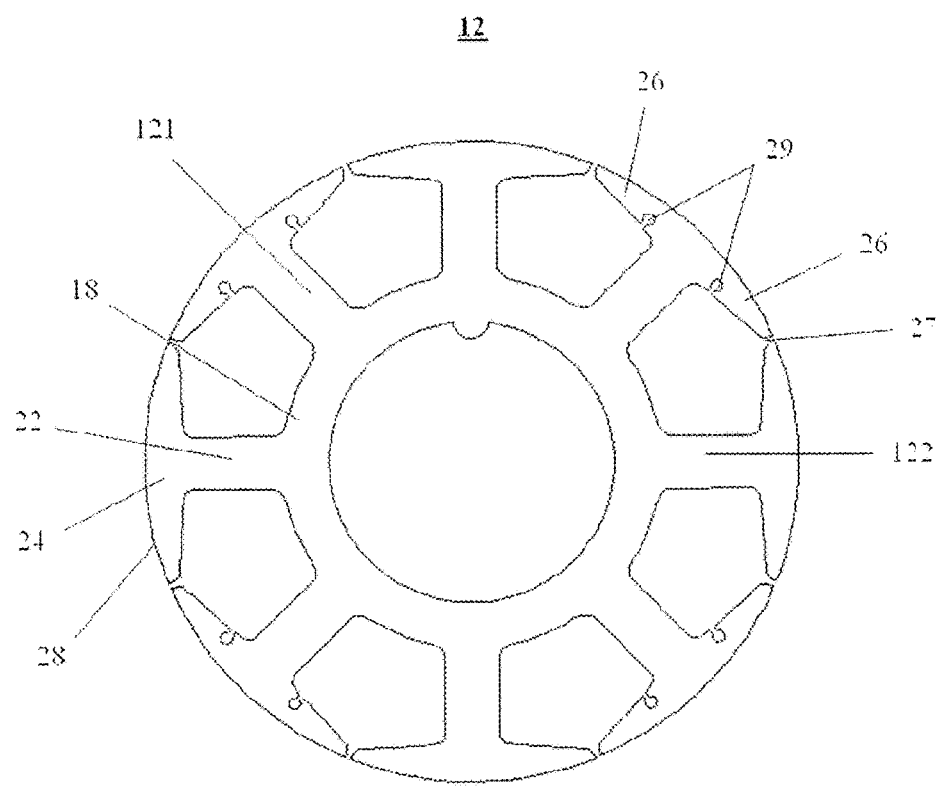
FIG. 18 illustrates a stator core according to a fifth embodiment.
Figure 19:
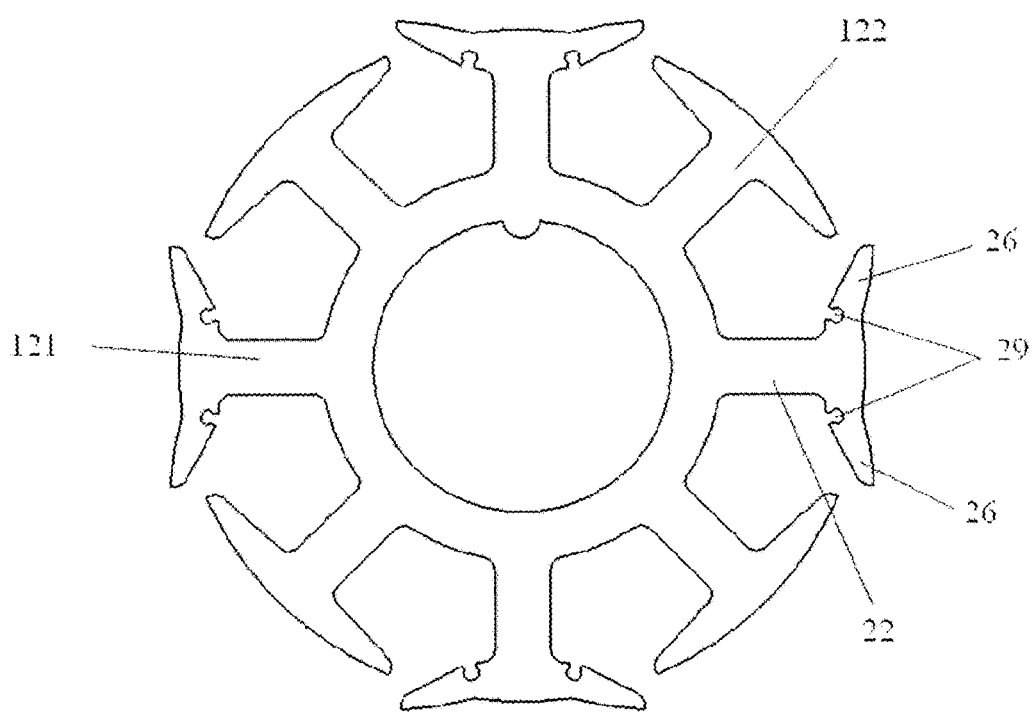
FIG. 19 illustrates the stator core of FIG. 18, prior to the winding process.

FIG. 16 through FIG. 19 illustrate another two embodiments of the stator core 12. All teeth 20 extend integrally outwardly from the yoke 18, including first teeth 121 and second teeth 122 that are alternatively arranged in the circumferential direction. Cutting grooves 29 are formed in two sides of each of the first teeth 121, while the second teeth 122 do not have the cutting grooves 29. In the embodiment of FIG. 16, the cutting grooves 29 are formed in the connecting corner areas between wing portions 26 and the winding arm 22. In the embodiment of FIG. 18, the cutting grooves 29 are formed in central areas of the wing portions 26. Prior to the winding process, as shown in FIG. 17 and FIG. 19, the wing portions 26 of each first tooth 121 are both tilted outwardly. For the two opposed wing portions 26 of two adjacent first teeth 121 and second tooth 122, one wing portion is in the form of the normal circular arc, while the other is tilted outwardly, which can also enlarge the gap between the two opposed wing portions 26 for facilitating the winding process. After the winding process is completed, the outwardly tilted wing portions 26 are bent inwardly to deform into the circular arc shape, such that the gap between the adjacent wing portions 26 becomes narrower to form the narrow slot opening 27 to thereby reduce the cogging torque. In addition to the cutting grooves 29, in one embodiment, in the stator core 12 of FIG. 17, each of the tooth tips 24 with two tilted wing portions 26 defines a dent 29' between the tilted wing portions 26 in an outer wall surface thereof.

Each of the above stator cores 12 defines the narrow slot opening 27. As such, when the stator core 12 and the rotor 30 cooperatively form the motor, the requirement of the width of the slot opening 27 not greater than two times of the width of the air gap can be satisfied, thereby achieving small cogging torque, stable operation and low noise of the motor. It should be appreciated by those skilled in the art that various modifications are possible without departing from the spirit or scope of the present invention. For example, the number of the slots and the number of the poles may be modified to be in the range of two-pole two-slot to N-pole N-slot depending upon actual requirements, which all fall within the scope of the present invention. Therefore, the scope of the invention is to be determined by reference to the claims that follow.

The invention claimed is:

1. A blower comprising:
    a housing comprising an inlet and an outlet;
    an impeller received in the housing; and
    a motor received in the housing, the motor configured to drive the impeller to rotate such that air enters the housing via the inlet and is discharged via the outlet, the motor comprising:
        a stator comprising a stator core and windings wound around the stator core, the stator core comprising a yoke and a plurality of teeth extending radially outwardly from the yoke, a distal end of each of the teeth forming a tooth tip, with a slot opening being formed between each two adjacent tooth tips; and
        a rotor comprising a permanent magnet forming a plurality of magnetic poles, the stator and the rotor defining an air gap therebetween, a circumferential width of the slot opening being equal to or less than two times of a radial width of the air gap;
    wherein each tooth comprises a winding arm connected to the yoke, the tooth tip is formed at a distal end of the winding arm, two circumferential ends of the tooth tip extend circumferentially beyond the winding arm to form two wing portions, at least one of the two wing portions at two sides of each slot opening is tilted outwardly prior to a winding process, and the tilted wing portion is bent inwardly after the winding process is completed;
    wherein one of the tooth tips with two tilted wing portions defines a dent between the tilted wing portions in an outer wall surface thereof.

2. The blower of claim 1, wherein the air gap is an even air gap, and an inner wall surface of the permanent magnet is concentric with outer wall surfaces of the tooth tips.

3. The blower of claim 2, wherein the permanent magnet is in the form of a single piece having a plurality of magnetic poles.

4. The blower of claim 2, wherein the permanent magnet comprises a plurality of magnet segments that are spaced from each other in a circumferential direction, and inner wall surfaces of the magnet segments are located on a common cylindrical surface.

5. The blower of claim 1, wherein outer wall surfaces of the tooth tips are located on a common cylindrical surface.

6. The blower of claim 1, wherein the teeth comprise a plurality of first teeth integrally formed with the yoke and a plurality of second teeth detachably connected to the yoke, the first teeth and the second teeth are alternatively arranged in a circumferential direction.

7. The blower of claim 1, wherein a cutting groove is formed in a connecting area where the tilted wing portion is connected to the tooth.

8. The blower of claim 7, wherein the cutting groove is formed in a central area of the inner wall surface of the tilted wing portion, and a section of the wing portion outside the cutting groove is tilted outwardly.

9. The blower of claim 7, wherein the cutting groove is formed in a connecting corner area between the wing portion and the winding arm, and the whole wing portion is tilted outwardly.

10. The blower of claim 1, wherein the teeth comprise first teeth and second teeth extending integrally from the yoke, the first teeth and the second teeth are alternatively arranged in a circumferential direction, the two wing portions of each of the first teeth are both tilted outwardly prior to a winding process, the tilted wing portions of the first teeth are bent inwardly after the winding process is completed.

11. The blower of claim 1, wherein a single one of the wing portions of each tooth is tilted outwardly prior to a winding process, the tilted wing portions of all teeth are located at same sides of the respective teeth, and after the winding process is completed, the tilted wing portions are bent inwardly such that the tooth tips are in the form of a circular arc.

12. The blower of claim 1, wherein the motor is a single phase motor.

13. The blower of claim 1, wherein the motor is an outer-rotor motor.

* * * * *